United States Patent Office 3,417,066
Patented Dec. 17, 1968

3,417,066
PROCESS FOR CHLOROMETHYLATING AND CROSSLINKING HIGH MOLECULAR WEIGHT AROMATIC COMPOUNDS
Herbert Corte, Opladen, and Otto Netz, Cologne-Ehrenfeld, Germany, assignors to Farbenfabriken Bayer Aktiengesellschaft, Leverkusen, Germany, a corporation of Germany
No Drawing. Filed Feb. 24, 1965, Ser. No. 435,026
Claims priority, application Germany, Apr. 11, 1964, F 42,598
13 Claims. (Cl. 260—88.1)

ABSTRACT OF THE DISCLOSURE

A reaction mixture of equimolar quantities of methylal and chlorosulphonic acid formed at a temperature below 40° C. is employed, preferably at temperatures from 0 to 60° C., for chloromethylating and crosslinking high molecular weight aromatic polymers.

---

It is known that noncrosslinked polymers of aromatic vinyl compounds may be converted, preferably after wetting with concentrated sulphuric acid, into crosslinked products containing chloromethyl groups, by treatment with a mixture of formaldehyde, chlorosulphonic acid and an oxygen-containing polar liquid which does not dissolve the polymer. When reacted with amines, for example, the resulting products yield resins with anion-exchange properties.

In the preparation of this reaction mixture of formaldehyde, chlorosulphonic acid and an oxygen-containing polar liquid two layers are formed, the smaller layer of lower specific gravity apparently being responsible for the introduction of chloromethyl groups, whilst the larger layer of higher specific gravity is responsible for the crosslinking.

If polystyrene is used as the starting material, the crosslinked polymers obtained by this process have the empirical composition $C_{16}H_{17}ClO$, corresponding to a chlorine content of 13.6% and a substitution degree of 0.5–0.6, i.e., only about every second aromatic nucleus contains a chloromethyl group. In addition, the reaction product contains about 6% oxygen but it is not known in which way the oxygen is bonded.

A process has now been found by which high molecular weight aromatic compounds may be chloromethylated and cross-linked. In this process, the chloromethylating agent is a mixture of approximately equimolar quantities of methylal and chlorosulphonic acid. For introducing one equivalent of chloromethyl groups per aromatic nucleus it is desirable to employ 1–5 equivalents, preferably 2–3 equivalents of the methylal/chlorosulphonic reaction mixture.

The high molecular weight aromatic compounds treated by the process according to the invention are known per se. Particularly suitable for this purpose are polymers and copolymers of aromatic vinyl or vinylidene compounds, such as styrene, vinyl toluene, vinyl naphthalene, and copolymers of aromatic monovinyl or monovinylidene compounds as exemplified above with other mono-olefinically unsaturated compounds, such as ethylene, propylene or compounds with conjugated carbon-carbon double bonds, such as butadiene or chloroprene.

These copolymers of the aforementioned aromatic monovinyl or monovinylidene compounds or mixtures of these aromatic monovinyl or monovinylidene compounds with the other aforementioned copolymerization components may also be crosslinked by copolymerizing the compounds or mixtures of compounds as indicated with crosslinking agents.

The following compounds are suitable crosslinking agents for the mentioned compounds: aromatic or aliphatic compounds, with several isolated carbon-carbon double bonds, such as divinyl benzene, substituted divinyl benzenes, diisopropenyl benzene, diisopropenyl biphenyl, trivinyl benzene, divinyl ketone, divinyl Schiff's bases (Makromolekulare Chem. 31 (1950), page 50), triacryloyl hexahydrotriazine and esters of polyhydric alcohols and olefinically unsaturated carboxylic acids, such as ethylene glycol diacrylate. The crosslinking agents may be used in quantities varying from 0.1 to 50 mol percent, preferably from 0.1 to 20 mol percent, based on the total amount of monomers. These copolymers may have either a gel-like or a sponge-like structure. Copolymers of this type are described, for example, in German patent specifications Nos. 829,223, 841,796, 848,257, in U.S. patent specifications Nos. 2,597,439, 2,597,440 and in German Auslegeschrift No. 1,045,102.

The chloromethylation agent used according to the invention is prepared as follows: chlorosulphonic acid is either added to the cooled methylal, or vice versa, preferably at temperatures between 0 and 40° C. Alternatively, methylal and chlorosulphonic acid are continuously contacted, while stirring and cooling, by means of metering units. The reaction is highly exothermic so that the reaction mixture has to be thoroughly cooled. If solvents are used for the other reactions, they may, if desired, be introduced during the preparation of the reaction mixture to dilute the methylal, the chlorosulphonic acid or both the reactants.

Depending upon the molar ratio, the reaction temperature and the purity of the starting materials, the reaction mixture is a colorless to light-brown uniform liquid which is miscible with inert organic solvents, such as chlorinated aliphatic hydrocarbons, e.g., carbon tetrachloride, ethylene chloride and 1,2-dichloropropane.

To carry out the process according to the invention, the high molecular weight aromatic compound is added in finely divided form, for example in the form of small beads, to the intensively stirred reaction mixture at a temperature below the boiling point, whereafter the reaction mixture is kept at temperatures below the boiling point, preferably in the range from 0 to 60° C., until the particles have reacted thoroughly and until the desired chlorine content has been reached.

For further working up, the reaction liquid may be poured off and the residue washed with solvents in order to remove the residual reaction liquid. Alternatively, the reaction liquid may be decomposed by treatment with, for example, water, methanol, ethanol or tetrahydrofuran.

In addition, molded products, such as filaments, spheres, bars and films may be prepared by treating solutions of high molecular weight aromatic compounds in inert solvents. Because a solvent is present, these products are crosslinked to a lesser extent than compact products subjected to the same reaction.

In place of noncrosslinked, soluble, high molecular weight aromatic compounds, it would even be possible to subject crosslinked insoluble aromatic compounds to the reaction according to the invention. In this case, the compounds in question are preferably swollen in inert solvents before the reaction. The degree of crosslinking is in any case increased by the process according to the invention, provided that the original crosslinking is stable under the reaction conditions. If this is not the case, as with crosslinking through ester groups, the original crosslinking is replaced by the new crosslinking according to the invention. In these instances, too, it is preferred to swell the crosslinked compound in an inert solvent before the treatment according to the invention.

In a modification of the process, crosslinked compounds may even be initially swollen in methylal or in methylal and a solvent, after which the chlorosulphonic acid may be gradually added.

The degree of crosslinking produced by the process according to the invention is at its highest when the reaction mixture is allowed to act undiluted on the high molecular weight aromatic compound. Dilution of the reaction mixture with solvents, and solution of the aromatic compound reduce the degree of crosslinking. The same applies as regards the treatment of crosslinked compounds. In this case, too, preliminary swelling with swelling agents produces a lower degree of crosslinking than treatment of the unswollen compound.

The chloromethylated crosslinked resins obtained in accordance with the invention may be converted in known manner into ion-exchange resins by treatment with amines, polyamines, aminocarboxylic acids, aminosulphonic acids or aminophosphonic acids, or by oxidation, in which case swelling agents may be added.

In addition, molded articles such as tubing, pipes and films of aromatic polymers or copolymers, may be chloromethylated and rendered insoluble by the process according to the invention. Ion-exchange membranes may be obtained by known processes from films treated in this way. Copolymers of olefinically unsaturated, aliphatic hydrocarbons and aromatic vinyl compounds are particularly suitable for this purpose.

EXAMPLE 1

470 g. of chlorosulphonic acid were added dropwise with intensive stirring to 310 g. of methylal (containing 6% by weight of methanol) at a temperature from 0 to 20° C. 200 g. of a styrene bead polymer (trade name Vestyron N) were introduced into this reaction mixture. After heating at 40° C. for 20 hours, the light-brown reaction liquid was suction-filtered and the granular reaction product was treated with ice and water. The chlorine content of a specimen extracted with tetrahydrofuran and dried was 14.6%.

Amination of the moist chloromethylation product with an aqueous trimethylamine solution in the presence of ethylene chloride produced a highly basic anion exchanger with a total capacity of 1.1 mval./ml. chloride form.

EXAMPLE 2

470 g. of chlorosulphonic acid were added dropwise to 310 g. of methylal at a temperature of 30 to 40° C. The resulting reaction mixture was diluted with 100 ml. of carbon tetrachloride. 200 g. of a styrene bead polymer (trade name Vestyron N) were then added with intensive stirring at 25° C., after which the mixture was kept at a temperature of 45° C. for 17 hours. The resulting chloromethylated product was shown by analysis to contain: C, 76.6%; H, 6.9%; Cl, 15.9%.

Treatment with an aqueous trimethylamine solution produced a high basic anion exchanger with a total capacity of 1.2 mval./ml. chloride form.

EXAMPLE 3

1410 g. of chlorosulphonic acid were added to 930 g. of methylal at 20 to 30° C. The resulting reaction mixture was diluted with 1000 ml. of ethylene chloride. 400 g. of a styrene bead polymer, mol. wt. 60,000) were then added with stirring, after which the mixture was kept at a temperature of 40° C. for 18 hours. The resulting chloromethylated product contained: C, 74.7%; H, 6.6%; Cl, 18.0%. After treatment with an aqueous trimethylamine solution, the product yielded a highly basic anion exchanger with a total capacity of 1.3 mval./ml. chloride form.

EXAMPLE 4

A 37% by weight solution of methylal in ethylene chloride and a 40% by weight solution of chlorosulphonic acid in ethylene chloride were continuously measured, in the ratio of 1 mol of methylal to 1 mol of chlorosulphonic acid, into an externally cooled glass tube which was so long that the exothermic reaction had ended at the outlet end.

300 g. of a p-vinyl toluene bead polymer were introduced with stirring into 2500 ml. of the resulting reaction mixture at a temperature of 25° C. After heating for 16 hours at 40° C., the brown reaction liquid was suction-filtered and the granular residue was treated with ice and water. The resulting chloromethylation product had a chlorine content of 18.7% and, on treatment with trimethylamine, yielded a highly basic anion exchanger with a total capacity of 1.1 mval./ml. chloride form.

EXAMPLE 5

940 g. of approx. 96% by weight chlorosulphonic acid were added dropwise with stirring to 620 g. of methylal (containing 5% methanol) at a temperature from 0 to 15° C. This reaction mixture was added with stirring at 20° C. to 300 g. of a styrene bead polymer which had been crosslinked with 4% by weight of divinyl benzene and swollen in 500 ml. of propylene dichloride. The temperature gradually rose and was kept at 30° C. for 15 hours. The deep-brown reaction liquid was then suction-filtered and the residue was washed twice with iced water. The chlorine content of a specimen extracted with tetrahydrofuran and dried, was 17.6%.

Amination of the product with an aqueous trimethylamine solution produced a highly basic anion exchanger with a total capacity of 1.5 mval./ml. chloride form.

EXAMPLE 6

900 g. of chlorosulphonic acid were added with stirring and cooling to 620 g. of methylal.

This reaction mixture was added at 20° C. to 500 g. of a styrene bead polymer which had been crosslinked with 3% triacryloyl hexahydrotriazine and swollen in 1,000 ml. of ethylene dichloride. The temperature rose gradually to 40° C. and was kept at this level for 12 hours. The reaction liquid was then suction-filtered and the granular reaction product was treated with ice and water. The chloromethylated product contained 19.1% of chlorine and, on treatment with an aqueous trimethylamine solution, yielded a highly basic anion exchanger with a total capacity of 1.4 mval./ml. chloride form.

EXAMPLE 7

300 g. of a bead polymer with a sponge-like structure which had been prepared by suspension polymerization of styrene with 2% by weight of divinyl benzene in the presence of 80% by weight of heptane (based on styrene+divinyl benzene), were swollen in 2000 ml. of ethylene chloride.

A reaction mixture comprising 620 g. of methylal and 940 g. of chlorosulphonic acid was added, and the mixture was heated at 40° C. for 20 hours. After the reaction liquid had been suction-filtered, the residue was treated several times with iced water. The chloromethylated product contained 19.6% of chlorine and, with trimethylamine, produced a highly basic anion exchanger with a total capacity of 1.2 mval./ml. chloride form.

EXAMPLE 8

A 0.5 mm. thick film prepared from polystyrene (trade name Polystyrol III) was treated for 20 hours at 25° C. with an equimolar reaction mixture of methylal and chlorosulphonic acid. The resulting brownish-red film was then washed with carbon tetrachloride and shaken for 10 hours at 40° C. with a 20% by weight aqueous solution of methyl β-dimethylamino-ethyl ether. After washing with water and dilute hydrochloric acid, an ion-exchange membrane was obtained. Ion-exchange membranes with improved mechanical and electrical properties were obtained by the same process from polystyrene-containing polyethylene films.

We claim:
1. A process for chloromethylating and crosslinking a high molecular weight aromatic polymer which comprises reacting equimolar quantities of methylal and chlorosulphonic acid at a temperature of from 0 to 40° C. and reacting said high molecular weight aromatic polymer with said reaction product at a temperature of 0 to 60° C.

2. Process according to claim 1 wherein said high molecular weight aromatic polymer is polystyrene.

3. Process according to claim 1 wherein said high molecular weight aromatic polymer is polyvinyl toluene.

4. Process according to claim 1 wherein said high molecular weight aromatic polymer is a styrene-divinyl benzene copolymer.

5. Process according to claim 1 wherein said high molecular weight aromatic polymer is a styrene-triacryloyl hexahydrotriazine copolymer.

6. Process according to claim 1 wherein a crosslinked high molecular weight aromatic polymer is swollen in an organic swelling agent and is then reacted with said reaction product.

7. Process according to claim 1 wherein 1 to 5 equivalents, based upon aromatic nuclei present in the aromatic polymer, of said reaction product is reacted with said high molecular weight aromatic polymer.

8. Process according to claim 1 wherein said reaction with said high molecular weight aromatic polymer is carried out in the presence of an inert organic solvent.

9. Process according to claim 8 wherein said inert organic solvent is selected from the group consisting of carbon tetrachloride, ethylene chloride and 1,2-dichloropropane.

10. Process according to claim 6 wherein said swelling agent is ethylene chloride.

11. A process for chloromethylating and crosslinking a high molecular weight aromatic polymer which comprises mixing a high molecular weight aromatic polymer with methylal and adding chlorosulphonic acid in an amount equivalent to the amount of said methylal at a temperature of 0 to 60° C.

12. A process for chloromethylating and crosslinking a high molecular weight aromatic polymer selected from the group consisting of:
  (a) linear homopolymers of aromatic vinyl or aromatic vinylidene monomers,
  (b) linear copolymers of aromatic vinyl or aromatic vinylidene monomers with mono-olefinically unsaturated aliphatic compounds or unsaturated aliphatic compounds having conjugated double bonds, and
  (c) crosslinked polymers or copolymers according to (a) and (b) above formed by polymerizing said monomers with aromatic or aliphatic compounds having at least two isolated double bonds, comprising reacting said aromatic polymer at a temperature of 0 to 60° C. with a reaction mixture formed by mixing approximately equimolar quantities of methylal and chlorosulphonic acid at a temperature of 0 to 40° C.

13. A process for chloromethylating and crosslinking a high molecular weight aromatic polymer selected from the group consisting of:
  (a) linear homopolymers of styrene, vinyl toluene or vinyl naphthalene monomers
  (b) linear copolymers of styrene, vinyl toluene or vinyl naphthalene monomers with ethylene, propylene, butadiene or chloroprene monomers and
  (c) crosslinked polymers or copolymers according to (a) and (b) above formed by polymerizing said monomers with divinyl benzene, diisopropenyl benzene, diisopropenyl biphenyl, trivinyl benzene, divinyl ketone, divinyl Schiff's bases, triacryloyl hexahydrotriazine or ethylene glycol diacrylate comprising reacting said aromatic polymer at a temperature of between 0 and 60° C. with from about 1 to about 5 equivalents based upon aromatic nuclei present in the aromatic polymer of a reaction mixture formed by mixing at a temperature between 0 and 40° C. approximately equimolar quantities of methylal and chlorosulphonic acid.

References Cited

UNITED STATES PATENTS

| 3,086,060 | 4/1963 | Greer | 260—614 |
| 3,297,648 | 1/1967 | Corte | 260—73 |

FOREIGN PATENTS

| 1,025,635 | 4/1966 | Great Britain. |

OTHER REFERENCES

Jones, Giffin D.: Ind. and Eng. Chem., Chloromethylation of Polystyrenes, vol. 44, No. 11, pp. 2686–2692, November 1952.

Olah, G. A.: Friedel-Crafts and Related Reactions, vol 2, Part II, pp. 665, 672–682 (1964).

JOSEPH L. SCHOFER, *Primary Examiner.*

R. S. BENJAMIN, *Assistant Examiner.*

U.S. Cl. X.R.

260—614, 2.1, 96, 88.1, 88.2, 93.5, 85.1, 87.5, 67.6, 467